Figure 1:
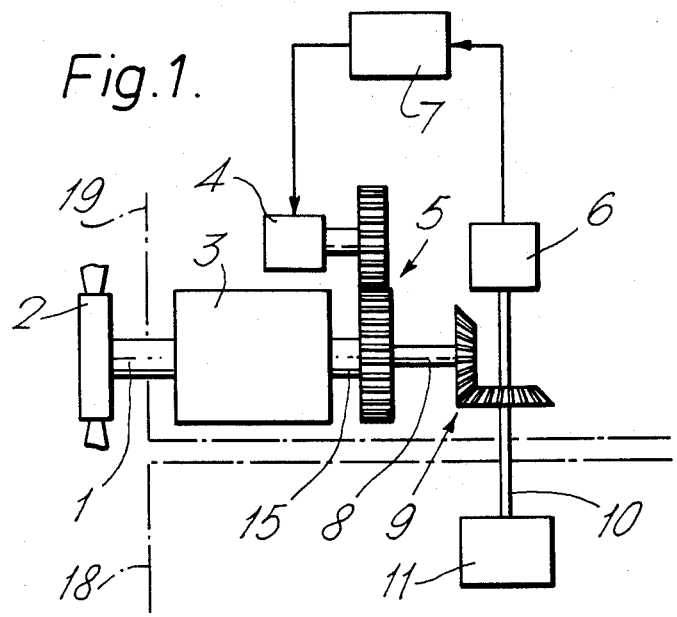

United States Patent [19]

Law

[11] Patent Number: 4,613,760
[45] Date of Patent: Sep. 23, 1986

[54] POWER GENERATING EQUIPMENT

[75] Inventor: Hilton Law, Leicestershire, England

[73] Assignee: The English Electric Company Limited, England

[21] Appl. No.: 649,828

[22] Filed: Sep. 12, 1984

[51] Int. Cl.⁴ .................. F16H 5/52; H02K 7/116
[52] U.S. Cl. .................................... 290/1 C; 290/44
[58] Field of Search ............... 290/1 C, 1 R, 44, 55; 318/12, 13

[56] References Cited

U.S. PATENT DOCUMENTS

| 2,795,747 | 6/1957 | Wellington, Jr. et al. | 318/13 |
| 4,280,061 | 7/1981 | Lawson-Tancred | 290/44 X |
| 4,357,542 | 11/1982 | Kirschbaum | 290/44 |
| 4,382,188 | 5/1983 | Cronin | 290/1 C |

FOREIGN PATENT DOCUMENTS 876884  9/1961  United Kingdom ............... 318/12

Primary Examiner—William M. Shoop, Jr.
Assistant Examiner—W. E. Duncanson, Jr.
Attorney, Agent, or Firm—Kirschstein, Kirschstein, Ottinger & Israel

[57] ABSTRACT

An alternating current electrical power generating system in which a generator (11) is driven by a fluid driven turbine (2), whose speed or torque may vary, which incorporates a differential drive unit (3) coupled to the turbine (2), the generator (11) and means, such as a reaction machine (6), arranged to control the torque on the respective input to the differential drive unit in response to changes in the speed of the turbine in the sense which tends to compensate for such speed variations and thereby reduce fluctuations of torque on the generator.

14 Claims, 6 Drawing Figures

POWER GENERATING EQUIPMENT

This invention relates to power generating equipment of the kind in which the rotational speed or torque of a fluid-driven turbine driving an alternating current generator may vary widely and in a random manner due to fluctuations in the speed of the fluid driving the turbine. In order to feed this power into the National Grid or to parallel a number of generators on to a common bus, it is necessary to control the torque applied to the generator or generators in order to prevent undesirable power fluctuations and to prevent the generator or generators from being pulled out of step.

The invention is especially concerned with systems of the kind in which a generator is driven by a wind turbine, but may also include the use of wave or tidal power.

The mean speed of the wind at any particular place tends, in general, to vary relatively slowly, but gusting gives rise to a fluctuating component composed of shorter and randomly varying periods which is superimposed on the mean speed component. Whilst changes in the mean wind speed can usually be catered for by altering the pitch angle of at least part of the turbine blades, shorter duration variations, as are caused by gusting, can give rise to difficulties, in view of the time which is normally takes to alter the pitch angle as a result of the response of the system.

In order to reduce the effect of such fluctuations on the generator in systems as constructed hitherto a degree of angular displacement resilience, as provided for example by a quill shaft or a mechanical gear box having its casing mounted for limited rotational movement against springs with suitable damping, is commonly incorporated in the coupling between the turbine and generator shafts, but in general such systems can only cope satisfactorily with relatively short period wind gust peaks, for example of not more than 5 seconds duration, and it is therefore necessary to utilise the blade pitch control in order to deal with fluctuations of longer duration.

One object of the present invention is to provide an alternative method of compensating for wind speed fluctuations in a wind powered electrical generating system which is less subject to this difficulty. However the invention is also applicable to other power generating equipment in which an electrical generator is driven by a turbine whose speed or torque may vary.

According to the invention in an alternating current electrical power generating system of the kind in which an electrical generator is driven by a fluid-driven turbine whose speed or torque may vary, the generator rotor is connected to the output shaft of a differential drive unit, one input of which is coupled to the turbine, and the arrangement includes means responsive to changes in the speed of rotation of the turbine, and arranged to control the torque on the other input of the differential drive u nit in response to such changes in the sense which tends to compensate for such speed variations and thereby reduce fluctuations of torque on the generator.

In such an arrangement the torque control means on the said other input of the differential drive unit, controls directly the load torque on the turbine and also the torque on the generator. Conveniently therefore the means for controlling the torque on the said other input is such as to cause the load torque on said input to increase, as the speed of the turbine increases, and so oppose the acceleration of the turbine, and vice versa.

However it may at times be desirable for the torque to stay constant or even reduce when the speed of the turbine increases.

When the turbine, such as for example a wind turbine, rotates at a speed corresponding to the synchronous speed of a synchronous generator the said other input is conveniently arranged to be stationary. A reduction or increase in the speed of the turbine will thus cause the other input to rotate in one or other direction so as to maintain the generator torque at a required value. However there are advantages for some systems in making the reaction machine stationary when the referred full load turbine speed is not equal to the synchronous speed. This is possible by suitable selection of gear ratios.

The said other input is conveniently coupled to a variable speed reaction machine which may, for example, be either an electric or a hydraulic motor.

The difference between the turbine speed and the referred generator speed is conveniently equal to the referred speed of the reaction machine shaft. That is, the speed of the reaction shaft is directly proportional to the deviation of turbine speed from a set speed, for example, synchronous speed where it is driving a synchronous generator. The control of torque as a function of difference speed is simple, convenient and rapid; considerable flexibility exists for the incorporation of non-linear or transient stability control laws if so required.

It will be seen that in an arrangement in accordance with the invention there is no angular displacement limit between the shafts of the turbine and the generator, as is the case with the resilient coupling arrangement described above, and it has a greater capability of absorbing longer term disturbances; consequently, when applied to wind powered generating systems, the frequency that the blade pitch control system needs to be brought into operation is significantly reduced.

Such a system can therefore be designed to compensate for cyclically varying speeds of the turbine over a wide range.

It is however, possible for the mean wind speed acting on a wind driven turbine to change by an amount such that subsequent cyclic variations take it outside the limit at one or other end of the range of control. Means are therefore preferably provided for adjusting the pitch of the turbine blades on such an occurrence in a manner which causes the mean speed of the turbine to return towards a value corresponding to synchronous speed of the generator.

It has been found that when the said other input is coupled to a suitably controlled variable speed reaction machine, the in ertia of the reaction machine tends to prevent adequate smoothing of high frequency fluctuations.

Preferably, therefore, there is introduced into the torque control means a negative feed forward signal proportional to reaction machine acceleration with the gain of this signal adjusted so that the resultant torque component compensates partly or fully for that required to accelerate the reaction machine. This has the effect of reducing the high inertia of the machine, giving a more rapid response.

With such an arrangement, the rate of response of the reaction machine to rapidly varying turbine speeds is significantly increased and its smoothing capability thereby improved.

Reaction machine torque, and therefore both the generator and turbine shaft torques, are effectively controlled from a function of reaction machine speed. The average torque level can be set by a low gain intergal control loop which tends to reduce reaction machine torque when the speed of the latter increases due to falling turbine speed. Thus, reaction machine torque and therefore that applied to the generator shaft tends to follow long term changes in turbine torque. For stability purposes a damping or droop torque control loop may also be provided.

Control is however, more conveniently effected by means of a computer responsive to appropriate command signal and programmed to achieve the optimum control conditions for any particular application of the invention. Such a control means thus may incorporate a computer programmed in a manner such that between two predetermined torque/speed characteristics, each varying in accordance with a relatively high value torque/speed constant, the torque changes according to a relatively low value torque/speed constant, whereas at speeds below and above that defined by the lower and higher respectively of the two characteristics the torque changes according to said high value torque/speed constant. Such an arrangement functions to limit the maximum speed of the reaction machine, by varying the torque reference to match substantial changes in mean wind speed, or turbine torque levels.

Figure 3:
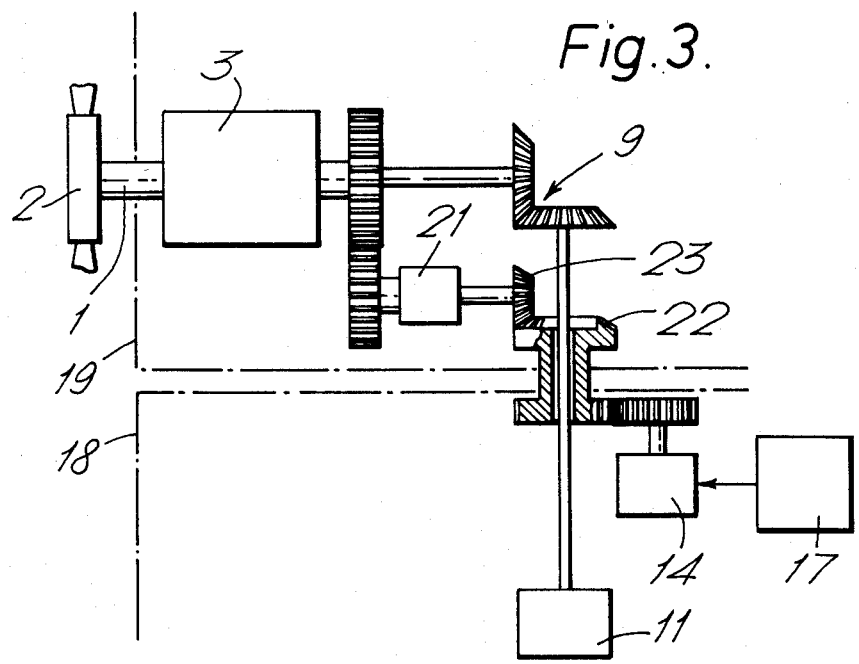
Figure 4:
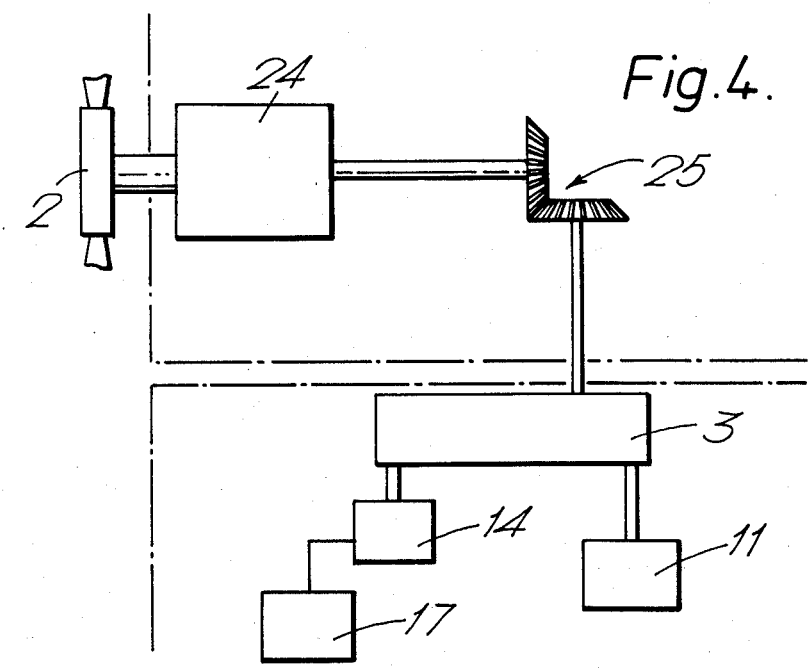
Figure 5:
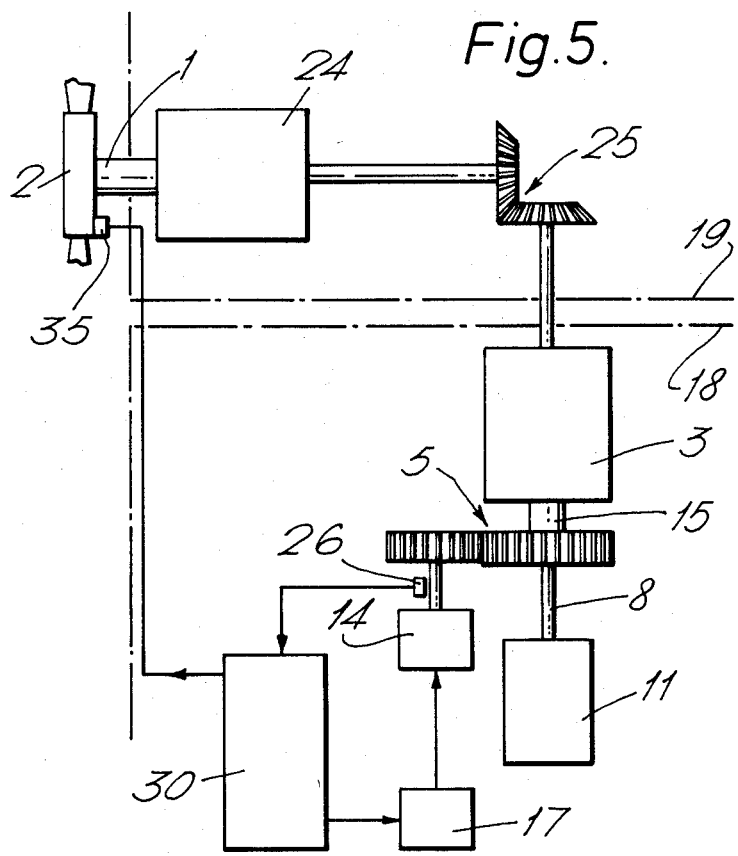
Figure 6:
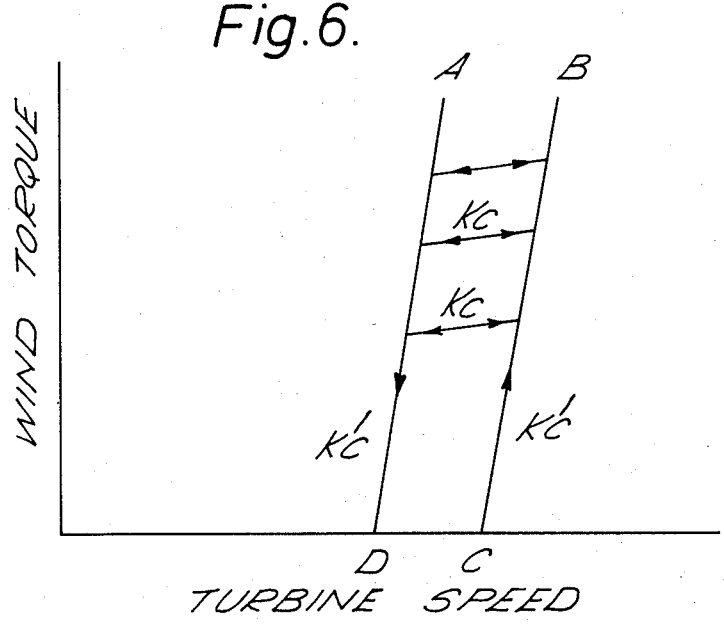

Several different embodiments of the invention will now be described by way of example with reference to FIGS. 1 to 6 of the accompanying schematic drawings, in which:

FIGS. 1–4 illustrate in diagrammatic form four different forms of power generating systems in accordance with the invention, and FIG. 5 shows the application of a computer to a generator system to achieve a form of control characteristics as illustrated in FIG. 6.

Referring first to FIG. 1, the shaft 1 of a wind driven turbine 2 provides the input to the ring gear of an epicyclic gear box 3. A hydraulic reaction motor 4 is coupled through gears 5 to a shaft 15 which is connected to the carrier of the epicyclic gear box 3, the motor 4 being arranged to be driven, in use of the system, by a pump 6 though a hydraulic controller 7. The sun gear of the gear box 3 is connected to an output shaft 8 which is coupled, through bevel gears 9, to the shaft 10 of an electrical synchronous generator 11, the shaft 10 also providing the drive for the pump 6.

Control of the torque of the reaction shaft 15 of the differential gear box 3 via the hydraulic controller 7 and motor 4 controls directly both the load torque on the wind turbine 2, and also the torque on the synchronous generator 11. In addition the difference between the turbine shaft speed and the referred generator speed, that is to say the speed of the output shaft 8 of the gear box 3 is equal to the speed of the reaction shaft 15. In other words the speed of the reaction shaft is directly proportional to the deviation of the turbine 2 from synchronous speed.

In operation, therefore, when the wind turbine is rotating at a speed corresponding to synchronous speed the reaction motor 4 will be stationary. However when the turbine speed reduces below the synchronous speed due to a drop in wind speed the rotation motor will start rotating in the motoring direction, taking power from the supply, causing the turbine load torque to decrease thereby compensating for the reduced wind speed and, within its range of control, maintaining the generator torque substantially constant. Similarly when an increase in wind speed causes the turbine to accelerate, the reaction motor will operate as a generator feeding power back into the supply, resulting in an increase in load torque, and again serving to maintain the generator torque substantially constant.

An arrangement as above described can be constructed to operate over a wide range of wind speed variations. However the mean wind speed can nevertheless vary, usually over a relatively long period to an extent such that a limit position is reached at which the system, by itself, can no longer provide adequate control of the generator torque. Means (not shown in FIG. 1) are therefore provided for automatically adjusting the pitch of the tips of the turbine blades, in a manner causing the mean speed of the turbine to return towards a value corresponding to the synchronous speed of the generator, the control system then operating, as before, to maintain the generator torque substantially constant despite variations of wind speed from its new mean value within its operating range.

The blade pitch control is conveniently actuated in response to a signal proportional to a predetermined change of turbine speed from synchronous speed as measured by reaction motor speed.

Figure 2:
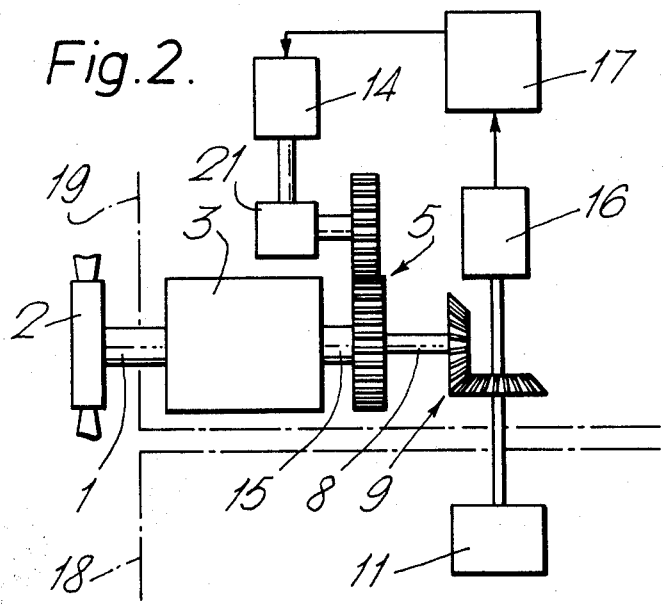

FIG. 2 illustrates a system generally similar to that of FIG. 1 except that the hydraulic reaction motor 4 and controller 7 are replaced by an electric reaction machine 14 and a variable speed controller 17, and the pump 6 is replaced by an auxiliary electrical generator 16 feeding the controller 17. An auxiliary gear box 21 is also interposed between the machine 14 and the gears 5 as shown.

This system operates in the same manner as that of FIG. 1 to maintain a substantially constant generator torque despite cyclic fluctuations in wind speed.

In both of the systems above described the main generator 11 is housed within the body 18 of a tower with its rotor axis vertical and coincident with the axis of rotation of a nacelle 19 accommodating the gear box 3 and the hydraulic motor or electric reaction machine and the controls therefore. Such an arrangement permits the nacelle 19 to rotate about a vertical axis in dependence upon the wind direction, without the need to rotate the generator stator. However it will be appreciated that the generator could alternatively be mounted in the nacelle.

An alternative to the arrangement illustrated in FIG. 2 is shown in FIG. 3. This system operates in the same manner as that of FIG. 2 but, instead of being mounted in the nacelle 19, the electric reaction machine 14 is also located in the part 18 of the tower which houses the main generator 11, and is connected to the auxiliary gear box 21 by idler and bevel gears 22 23, the idler gear 22 being supported for rotation coaxially around the main generator shaft 10. The advantage of this arangement is that the auxiliary generator 16 is not required and the variable speed controller can also be located in the main part 18 of the tower (as shown) or even in a position remote from the wind generator installation. This leads to simplicity and ease of access to the controller where the generator installation itself is not conviently situated.

A further alternative is illustrated in FIG. 4 which shows diagrammatically the epicyclic gear box 3, as well as the main generator 11 and reaction machine 14 located in the main part 18 of the wind tower, the wind turbine 2 being coupled to the epicyclic gear box through a primary step-up gear box 24 and bevel gears 25.

A computer (not shown in FIG. 4) is conveniently provided to ensure that feed back to effect the control of the reaction motor is such as to achieve the most satisfactory operating conditions for any particular application of the invention.

In a modification of the arrangement of FIG. 4 the electrical reaction machine 14 is replaced by a hydraulic reaction motor as in the arrangement of FIG. 1.

The embodiment illustrated in FIG. 5 is generally similar to that of FIG. 4, and reaction machine torque, and therefore both the generator and wind turbine shaft torques are controlled by a function of the reaction machine speed, by means of a sensor 26 which monitors the speed of the reaction machine, and feeds signals to a control computer 30 which controls, in turn, the machine torque via the speed controller 17.

In this system an algorithm is built into the control computer 30 such that the torque control law of the reaction machine 14 is as shown in FIG. 6. Thus when the speed of the turbine 2 is within the range defined by characteristics DA and CB, a change in turbine speed (i.e. as measured by changes in reaction machine speed) causes the torque to change according to a low value torque/speed constant as represented by Kc. If the turbine speed is less than or equal to that defined by the characteristic DA, an increase in speed causes the torque to increase according to the low value torque/speed constant as before, but a decrease in speed causes the torque to decrease according to a high value torque/speed constant K'c. Similarly, when the speed of the turbine 2 is equal to or is greater than that defined by the characteristic CB, the torque for a reduction in speed follows the low gain characteristic Kc and for an increase in speed the high gain characteristic K'c. Such an arrangement functions to limit the maximum speed of the reaction machine and enables the generator to follow long term changes in wind speed above described.

This is achieved by the appropriate selection of feedback signals, and enables it to maintain an adequate follow up of long term wind velocity changes.

Thus the action of the control algorithm is to regulate the reaction machine torque so that this matches the turbine torque level derived from the wind, by keeping the reaction machine speed within its operating range (typically ±5% referred to the generator).

In operation, as an example, assume the wind turbine is at full load at synchronous speed, and the reaction machine is stationary, with load torque and wind turbine torque in balance. A decrease in wind speed will provide deceleration torque and the wind turbine speed will start to decrease, causing also the reaction machine to start rotating (motoring). Reaction machine and thus generator torque will only reduce slightly at first (the reduction would be zero if Kc were made to be zero) but if the change in wind speed persists the reaction machine speed will eventually reach −5% referred to the generator. Further change in turbine and thus reaction machine speed causes the reaction machine torque to reduce rapidly according to gain K'c. This will tend to oppose further speed reduction. At this point a small increase in wind speed will cause the turbine to start accelerating and the reaction machine to reduce speed. The control algorithm is so arranged that the torque control does not follow back up the Kc' slope but immediately follows the low gain Kc slope. Thus a new mean torque level is set consistent with the new wind speed level.

For small cyclic variations of wind speed causing turbine speed variation of less than ±5% the system reaches the amplitude of these torque variations at the generator. However the system enables the generator torque to follow long term changes in wind speed when the turbine speed varies by more than ±5% from the generator speed.

Means (shown diagrammatically at 35) are provided for effecting the adjustment of the pitch of the turbine blades, as appropriate.

There is also conveniently introduced into the torque control system a negative feed forward signal proportional to reaction machine acceleration, the gain of this signal being adjusted so that the resultant torque component compensates partly or fully for that required to accelerate the reaction machine.

Such an arrangement has been found to compensate at least partly for the inertia of the electric reaction machine giving an improved response to rapid wind velocity fluctuations.

The arrangement conveniently includes means (not shown) for actuating the blade pitch control system to feather the blades, as well as brakes, to prevent damage to the system in the event of any excessive disturbances.

A similar form of control system can be applied to the system previously described.

Although the invention has been described with reference to synchronous generators, induction generators may, of course, be used as an alternative if desired.

I claim:

1. An alternating current electrical power generating system of the kind in which an electrical generator is driven by a turbine whose torque can vary, comprising a differential drive unit having an output shaft coupled to the generator, a first input coupled to the turbine and a second input coupled to a reaction machine, the latter controlling the torque on said second input in response to changes in the first input in a sense which tends to compensate for turbine torque variations and thereby reduce fluctuations of torque on the generator.

2. A system according to claim 1 wherein the torque control means on the said second input of the differential drive unit directly controls the load torque on the turbine as well as the torque on the generator.

3. A system according to claim 2 wherein said means for controlling the torque on the said second input is such as to cause the load torque on said first input to increase, as the speed of the turbine increases, and so oppose the acceleration of the turbine, and vice versa.

4. A sytem according to claim 2 wherein the said second input is arranged to be stationary when the turbine rotates at a speed correspondign to synchronous speed of the generator, and which is arranged to be rotated in one direction or the other in response to a reduction or increase in the speed of the turbine so as to maintain the generator torque substantially constant.

5. A system according to claim 1 wherein said machine is either an electric or a hydraulic motor.

6. A system according to claim 1 wherein reaction machine torque, and therefore both generator and turbine shaft torques, are controlled from a function of reaction machine speed.

7. A system according to claim 6 wherein the reaction machine torque is varied by a low gain integral control loop so that the torque applied to the generator shaft tends to follow long term changes in the turbine torque.

8. A system according to claim 7 wherein a damping or droop torque control loop is provided for stability.

9. A system according to claim 1 wherein said control means responsive to changes in the speed of rotation of the turbine comprises a computer which is programmed to achieve the optimum control conditions.

10. A system according to claim 1 wherein said turbine is a wind driven turbine.

11. A system according to claim 10 further comprising means for adjusting the pitch of the turbine blades which causes the mean speed of the turbine to return to a value corresponding to synchronous speed of the generator.

12. An alternating current electrical power generating system of the kind in which an electrical generator is driven by a turbine whose torque can vary, comprising a differential drive unit having an output shaft coupled to the generator, a first input coupled to the turbine, and a variable speed reaction machine responsive to changes in the torque or speed of rotation of the turbine, and arranged to control the torque on a second input of the differential drive unit in response to such changes, and means for introducing into said torque control means a negative feed forward signal proportional to the reaction machine acceleration with the gain of this signal adjusted so that the resultant torque component compensates partly or fully for that required to accelerate the reaction machine whereby fluctuations of torque on the generator are substantially reduced.

13. An alternating current electrical power generating system of the kind in which an electrical generator is driven by a turbine whose torque can vary, comprising a differential drive unit having an output shaft coupled to the generator, a first input coupled to the turbine, and a computer responsive to signals indicative of changes in the speed of rotation of the turbine, and arranged to control the torque on a second input of the differential drive unit in response to such changes, said computer being programmed in a manner such that between two predetermined torque/speed characteristics, each varying in accordance with the relatively high value torque/speed constant, the torque changes according to a relatively low value torque/speed constant, whereas at speeds below and above that defined by the lower and higher respectively of the two characteristics the torque changes according to said high value torque/speed constant.

14. An alternating current electrical power generating system of the kind in which an electrical generator is driven by a wind driven turbine whose torque can vary, a differential drive unit having an output shaft coupled to the generator, a first input coupled to the turbine, and a computer responsive to signals indicative of changes in the speed of rotation of the turbine, and arranged to control the torque on a second input of the differential drive unit in response to such changes, the system including also means for adjusting the pitch of the turbine blades which causes the mean speed of the turbine to return to a value corresponding to synchronous speed of the generator, said means being operative when the mean wind speed acting on the turbine changes by an amount greater than that within the range of control.

* * * * *